United States Patent [19]

Kirby et al.

[11] Patent Number: 5,925,117

[45] Date of Patent: *Jul. 20, 1999

[54] METHOD AND APPARATUS FOR ENABLING APPLICATION PROGRAMS TO CONTINUE OPERATION WHEN AN APPLICATION RESOURCE IS NO LONGER PRESENT AFTER UNDOCKING FROM A NETWORK

[75] Inventors: Graham D. Kirby; Sriram Visvanathan; Suresh K. Marisetty, all of San Jose, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/367,444

[22] Filed: Dec. 28, 1994

Related U.S. Application Data

[51] Int. Cl.$^6$ .................................................. G06F 13/00
[52] U.S. Cl. ............................................ 710/101; 361/281
[58] Field of Search ........................... 395/650, 700; 364/514; 361/683, 686; 709/102, 500, 686, 101, 100

[56] References Cited

U.S. PATENT DOCUMENTS

| | | | |
|---|---|---|---|
| 5,302,947 | 4/1994 | Fuller et al. | 340/825.34 |
| 5,323,291 | 6/1994 | Boyle et al. | 361/683 |
| 5,347,425 | 9/1994 | Herron et al. | 361/683 |
| 5,386,567 | 1/1995 | Lien et al. | 395/700 |
| 5,463,742 | 10/1995 | Kobayashi | 395/281 |
| 5,488,572 | 1/1996 | Belmont | 364/514 R |
| 5,526,493 | 6/1996 | Shu | 395/281 |
| 5,596,728 | 1/1997 | Belmont | 395/281 |
| 5,598,537 | 1/1997 | Swanstrom et al. | 395/281 |
| 5,642,517 | 6/1997 | Shirota | 395/750 |

*Primary Examiner*—Majid A. Banankhah
*Attorney, Agent, or Firm*—Blakely, Sokoloff, Taylor & Zafman LLP

[57] ABSTRACT

The present invention provides a method and apparatus for maintaining application integrity in a hot, disconnected network environment. The present invention provides a system having a computer subsystem with a processor executing application programs in an operating system environment. The system also includes a network and a connection to connect the network to the computer system. A notification mechanism detects when the network resources are no longer connected and permits continued use of the computer subsystem while it remains disconnected from the network.

20 Claims, 5 Drawing Sheets

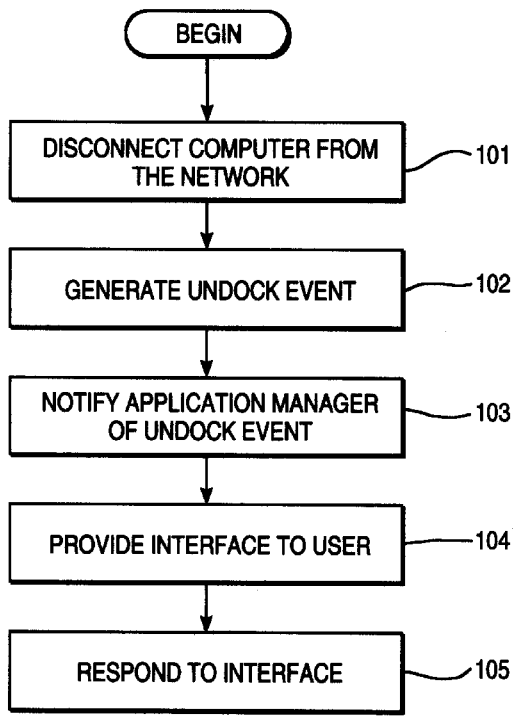
FIG_1A
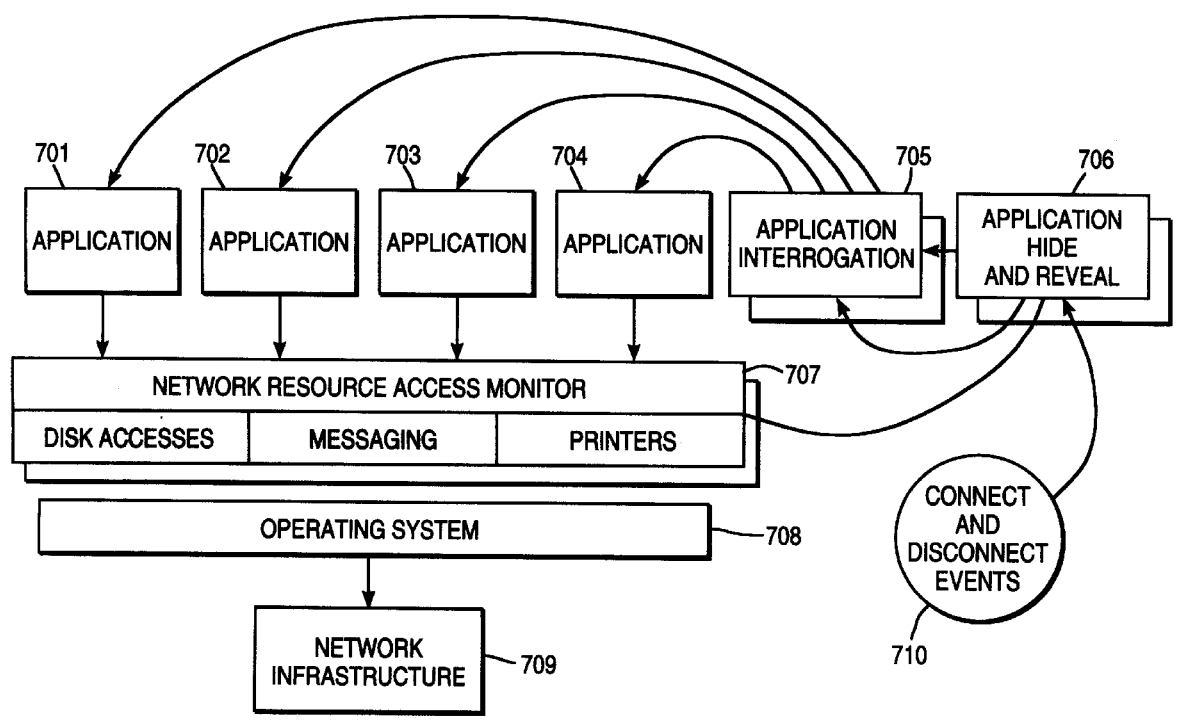
FIG_1B

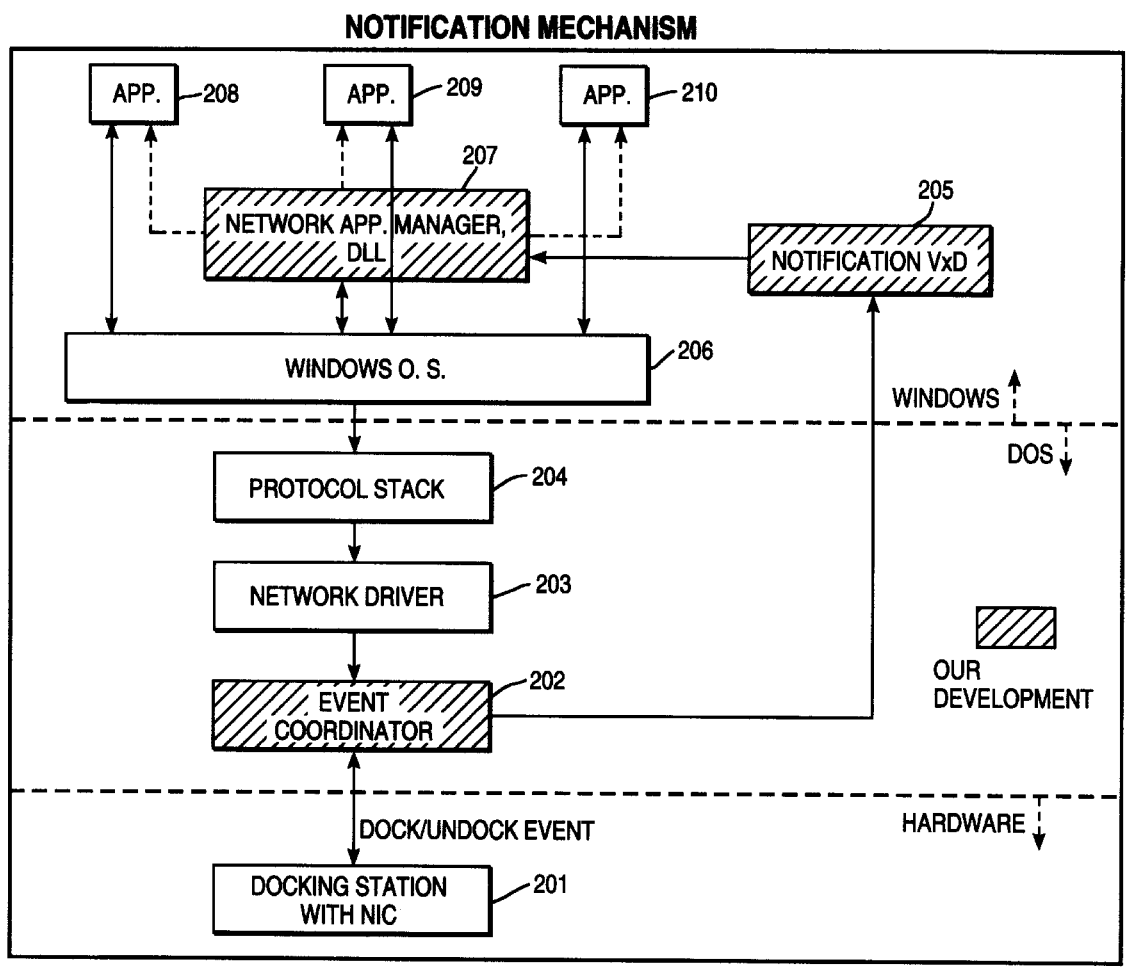
FIG_2
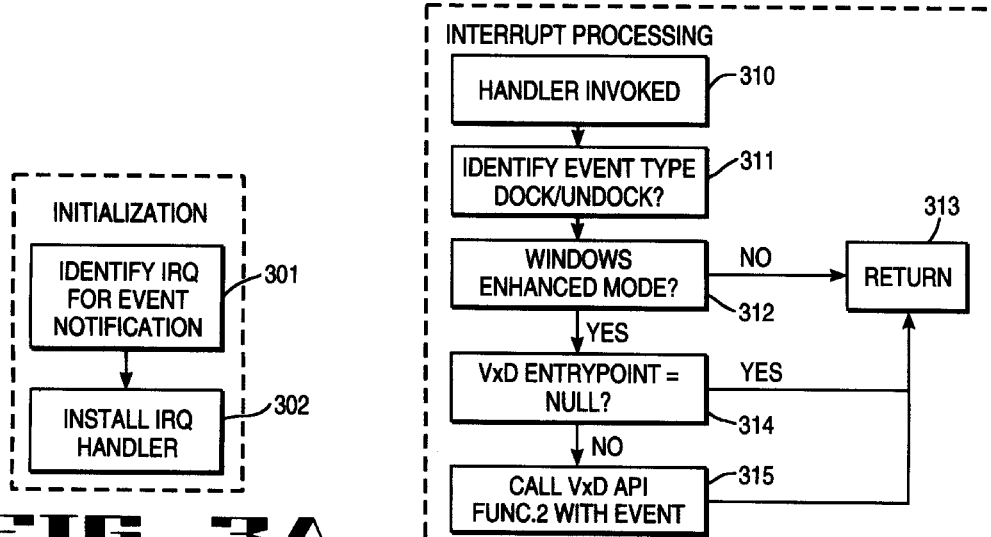
FIG_3A  FIG_3B

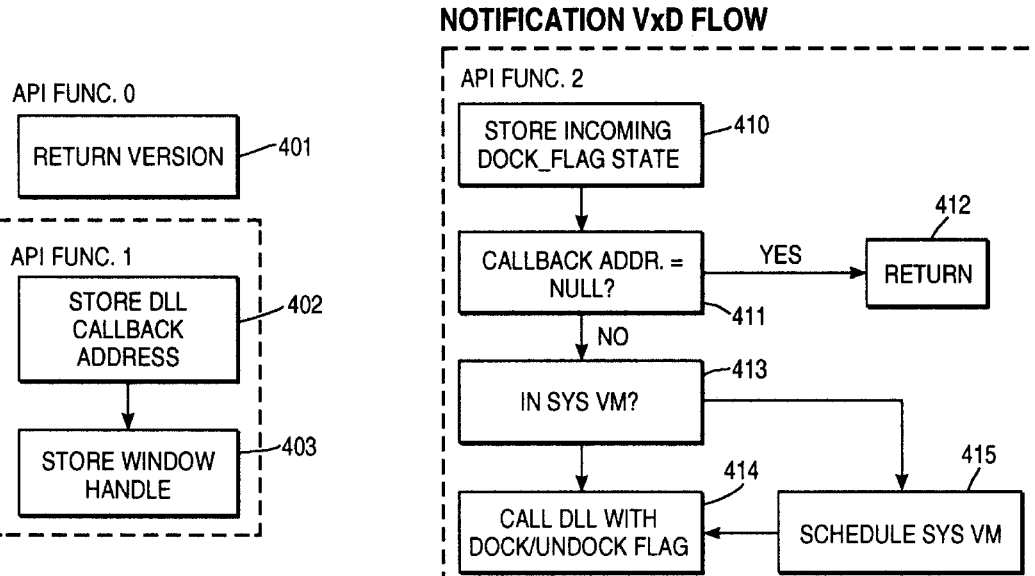
FIG_4A
FIG_4B
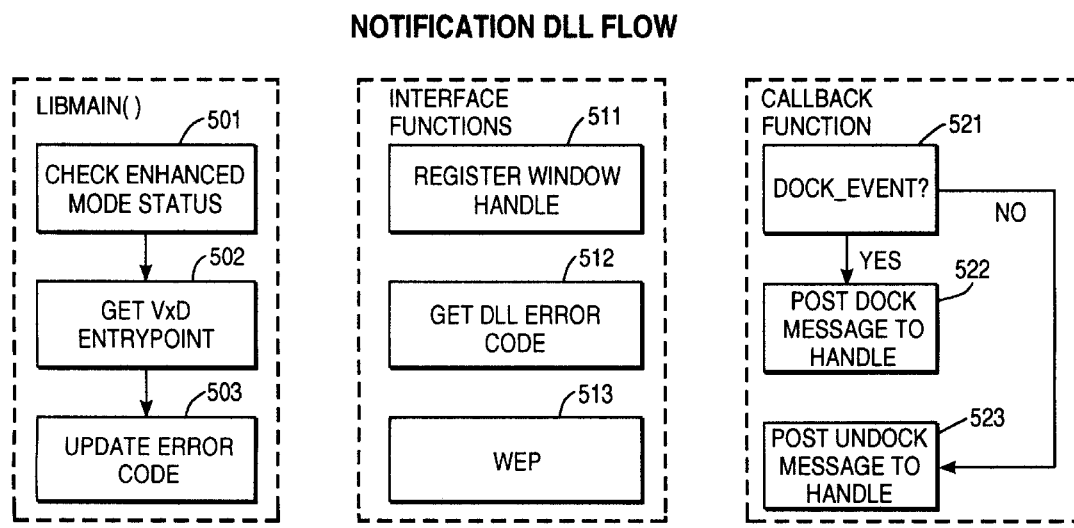
FIG 5A
FIG 5B
FIG 5C

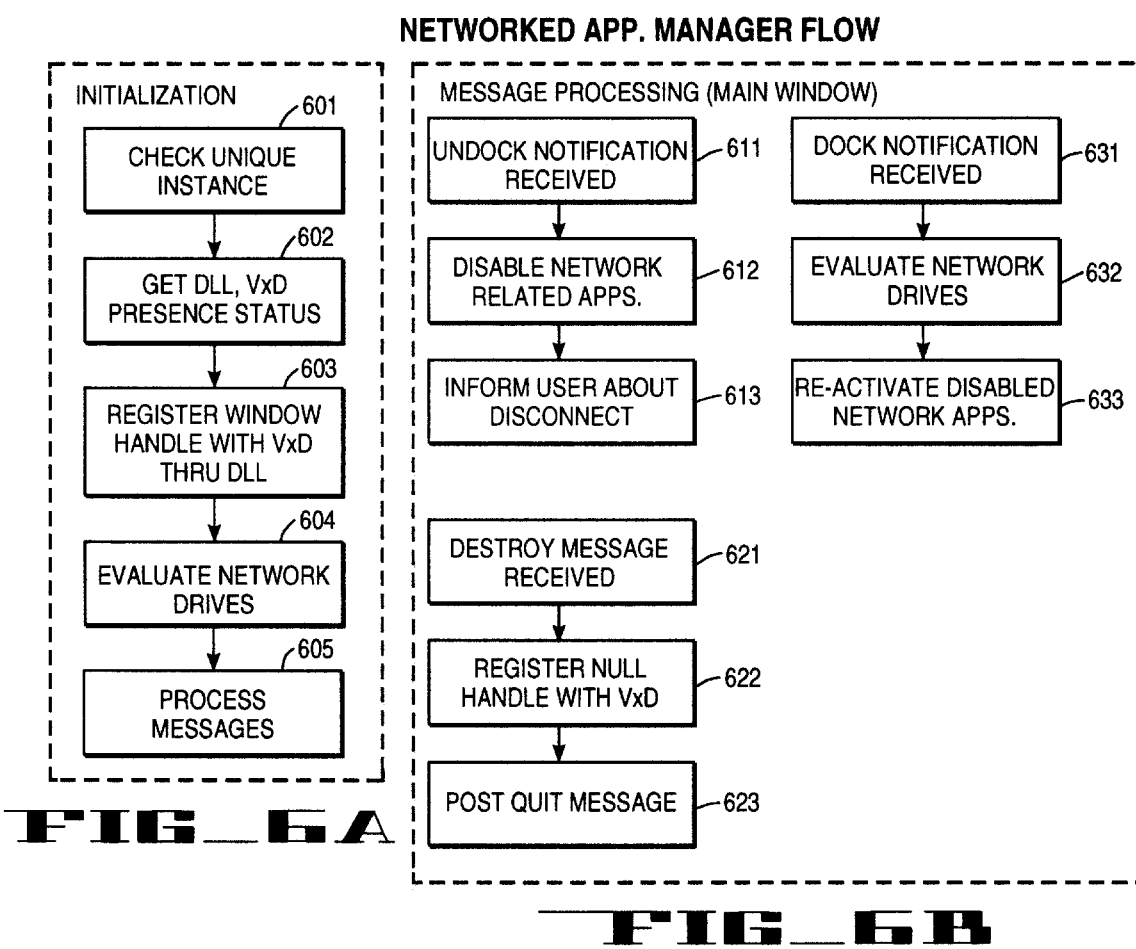

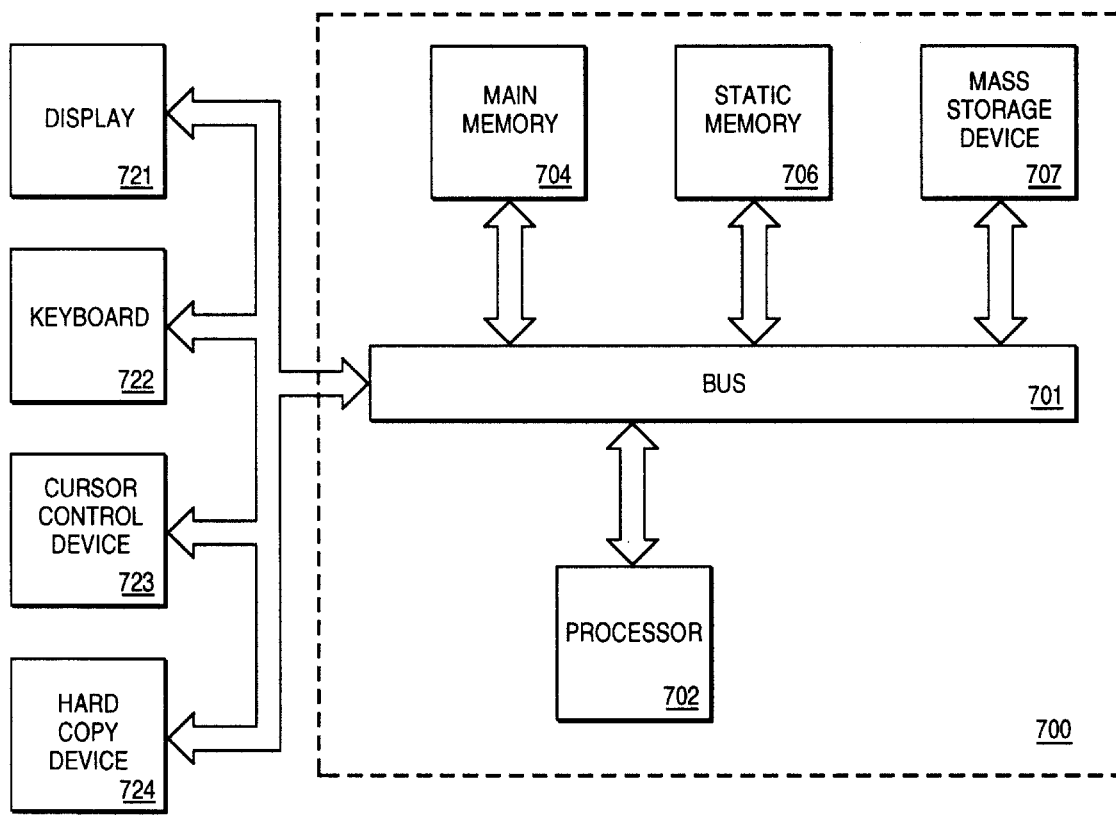
FIG_7
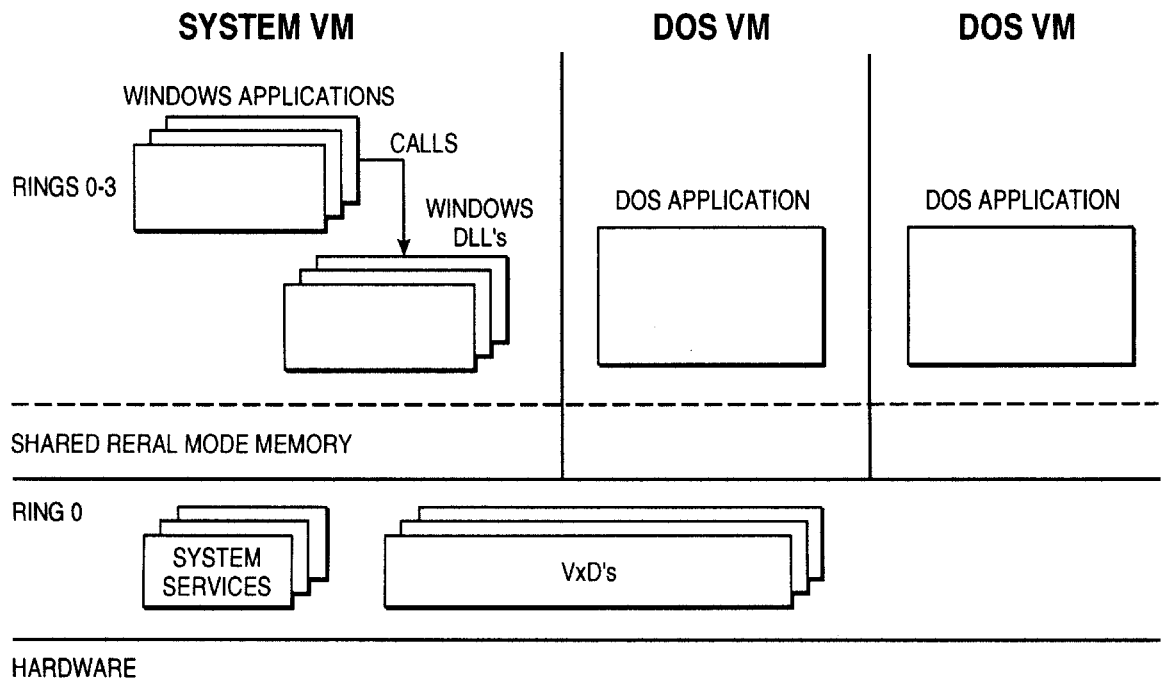
FIG_8

METHOD AND APPARATUS FOR ENABLING APPLICATION PROGRAMS TO CONTINUE OPERATION WHEN AN APPLICATION RESOURCE IS NO LONGER PRESENT AFTER UNDOCKING FROM A NETWORK

FIELD OF THE INVENTION

This invention relates to the field of computer systems; more particularly, the invention relates to the field of monitoring the presence and absence of resources and maintaining the integrity of an application program running when an application resource is determined to be absent.

BACKGROUND OF THE INVENTION

Today, mobile computer systems have incorporated more features that were once only available on desktop personal computers. A docking station with a network interface card used in conjunction with a mobile computer system allows a user to access services usually only available to a desktop computer system, and in doing so, resemble a desktop computer.

Presently, in order to dock (connect) and undock (disconnect) a computer system from a docking station coupled to a network, the user must close all network related applications, one by one. The user then logs off the network. At that time, the user may undock the mobile computer from the docking station. When the system is docked again (e.g., the user connects the docking station to the computer system), a log-on sequence has to be executed by the user. If the user desires to edit files that were being edited prior to undocking of the mobile computer system, then the corresponding application(s) and file(s) have to be reopened. This is the only method of returning to the previous state of the network. To maintain mobility of a computer system, it is desirable that once a user has logged onto a network, that he or she be free to remove the mobile computer system from the docking station, return back to the docking station and return to the state the system was in immediately prior to removal.

When a user disconnects the mobile computer from the docking station without following these steps, the system may crash or hang up when a network resource disappears. Today, applications do not have any inherent knowledge of the dynamic nature of the network or that the network has to be controlled by other means when network resources appear or disappear (if the appearance and disappearance of network resources are to occur dynamically).

Developments in the networking operating system allow a user to disconnect from the network without having to log out and thereafter log on. Currently there is a network that is capable providing a virtual connection for a short period of time after disconnect from the docking station during which time the network assumes that it is coupled to the mobile computing system. However, if the user does not close all the applications or the user wishes to edit the file or manipulate the network after undocking, the system may crash or hang up.

The present invention provides for maintaining application integrity in the hot networking environment, such that the appearance and disappearance of network resources can occur dynamically.

SUMMARY OF THE INVENTION

The present invention provides a method and apparatus for maintaining application integrity in a hot, disconnected network environment. The present invention provides a system having a computer subsystem with a processor executing application programs in an operating system environment. The system also includes a network and a connection to connect the network to the computer system. A notification mechanism detects when the network resources are no longer connected and permits continued use of the computer subsystem while it remains disconnected from the network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A is a flow diagram illustrating the process of the present invention.

FIG. 1B illustrates one embodiment of an architecture of the present invention.

FIG. 2 illustrates one embodiment of the notification mechanism of the present invention.

FIG. 3A is a flow diagram illustrating one embodiment of the initialization process for the event coordinator of the present invention.

FIG. 3B is a flow diagram illustrating one embodiment of the interrupt processing for the event coordinator of the present invention.

FIG. 4A is a flow diagram illustrating one embodiment of the initialization process of the notification virtual device driver (VxD) of the present invention.

FIG. 4B is a flow diagram illustrating one embodiment of the a function of the notification virtual device driver (VxD) of the present invention that may be called by the event coordinator.

FIGS. 5A, 5B and 5C illustrate the notification DLL flow of the present invention.

FIG. 6A is a flow diagram of one embodiment of the initialization process of the networked application manager of the present invention.

FIG. 6B is a flow diagram of one embodiment of the message processing of the networked application manager of the present invention.

FIG. 7 is a block diagram of one embodiment of the computer system of the present invention.

FIG. 8 illustrates the Windows operating system operating in enhanced mode.

DETAILED DESCRIPTION OF THE INVENTION

A method and apparatus for providing a network connection to a computer system is described. In the following detailed description of the present invention numerous specific details are set forth, such as specific interrupts, module names, signal names, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview of the Present Invention

The present invention maintains the integrity of a computer system when that system becomes disconnected (hot) from a resource such as, for instance, a network. By maintaining the integrity of a computer system, the present invention allows the computer system (e.g., mobile PC) to continue in use without rebooting even though applications are loaded and running on the computer system that require access to network (or other) resources yet no longer have them available.

The present invention allows the user to freely remove a mobile computer system from a docking station and return to the same state once connection is reestablished. In order to provide for such application integrity, the present invention comprises a notification mechanism to indicate that the docking station is no longer connected to the computer system. While disconnected from the docking station, and thus the network, the network maintains the client connection as if the computer system is still connected to the docking station and the network.

The present invention also provides an environment that allows management of all network related applications (clients). The dynamic events associated with appearance and disappearance of resources (e.g., network resources) are monitored on behalf of the applications and the user is presented with a choice of either closing the networked application or disabling it (when resources are no longer available) until the reconnect is achieved.

FIG. 1A illustrates a flow chart of the present invention. Referring to FIG. 1A, the process of the present invention begins by disconnecting the personal computer from the network, or other resource (processing block 101). In response to the computer system being disconnected from the network, an event (e.g., an interrupt) is generated (processing block 102). That is, an event is generated when a resource is no longer available. Next, an intelligent server (e.g., L V×D) notifies an application manager that manages applications using the network of the presence of the interrupt (processing block 103). The application manager provides an interface to the user (processing block 104). This interface indicates to the user of any network services which might have been opened when the disconnect occurred. The interface allows the user to indicate to the computer system what should be done with the application and those resources. For instance, if a file on the network was being accessed, the interface may ask the user whether the file should be closed. In response, the user makes a desired selection or performs the desired task to respond to the prompt (processing block 105). In one embodiment, the application manager removes the application (that no longer has access to its resources) from use, while allowing use of the other applications being run on the computer system.

FIG. 1B illustrates a block diagram overview of the interaction of the present invention. Referring to FIG. 1B, an operating system 708 is shown in communication with network infrastructure 709. Various applications such as applications 701–704 run in the computer system. Processing logic in the computer system runs access monitor software that resides below applications 701–704 to track what resources are being used by each application. Such resources may include, for example, disk accesses, messaging, and printer resources. In conjunction with operating system 708, applications 701–704 gains access to network infrastructure 709. The processing logic of the computer system runs application interrogation software 705 that operates as a detection module to detect when resources are and are not presently available to applications 701–704 (in response to connect/disconnect events 710). Similarly, application "hide and reveal" software 706 executing in the computer system hides an application's instance (e.g., availability/accessability) when disconnected if that application uses network resources that are no longer available. The execution of application "hide and reveal" software 706 reveals an application's instance (e.g., availability/accessibility) when those resources are once again available.

Note that the software referred to in the present invention controls the operation of hardware in the computer system and may be implemented in various programming languages. Also the software may be implemented, in full or in part, as firmware.

The Windows Environment

The Microsoft® Windows operating environment provides a graphical user interface (GUI) which makes Windows application programs easier to use. Microsoft® Windows environment runs Windows applications located in the extended area of memory above the 1 megabyte boundary using the protected mode of a processor, such as an Intel Architecture Microprocessor, manufactured by Intel Corporation of Santa Clara, Calif., the corporate assignee of the present invention.

The Microsoft® Windows 3.1 system can operate in one of two modes: "standard" mode and "enhanced" mode. The standard mode exists so that personal computers equipped with older 80286 processors can use the Windows environment. The enhanced mode of Microsoft® Windows is used when Microsoft® Windows is run on a computer system which uses an 80386 microprocessor or more recently available microprocessors such as, for instance, the i486™ processor.

The enhanced mode of Microsoft® Windows operates in the protected mode of the Intel Architecture Microprocessors (e.g., i386™ processor, i486™ processor, etc.). In this manner, the enhanced mode of Microsoft® Windows takes advantage of features in the Intel Architecture Microprocessors to offer virtual memory and multitasking operation. The processor hardware supports execution of several Windows applications in protected mode.

The enhanced mode of Microsoft® Windows supports DOS applications using "DOS virtual machines." In a DOS Virtual Machine, the Intel Architecture Microprocessor operates in Virtual 8086 mode and uses the virtual memory feature to provide DOS, device drivers, and Terminate and Stay Resident (TSR) programs originally loaded into the computer to a DOS virtual machine in extended memory. Windows uses the virtual memory system to make the application area and the DOS, device drivers, and TSR programs appear to be a single contiguous block of real mode memory. When the microprocessor is operating in Virtual 8086 mode within the address area of DOS virtual machine, the Virtual 8086 mode microprocessor is unaware of any memory outside of the DOS virtual machine.

FIG. 8 provides a conceptual diagram of the Windows system in enhanced mode. Referring to FIG. 8, the computer system hardware is represented as a label. The Ring 0 level with the Kernel and virtual device drivers (VxDs) is also shown, along with the system virtual machine (VM) and the various DOS virtual machines (VMs). Windows creates DOS virtual machines by mapping DOS, device drivers, and TSR programs in the system VM into the DOS VMs. Therefore, all the virtual machines share a region of memory called the shared real mode memory.

The Virtual device drivers (VxDs) at ring 0 are a special feature of Microsoft® Windows enhanced mode. A virtual device driver is actually a routine which manages a system resource such that more than one application can use the system resource at a time. Virtual device drivers therefore support Windows' ability to act as a multitasking operating system. The virtual device drivers, including the VxD of the present invention, have access to a wide range of kernel services, including those for hardware management, memory management, task scheduling, and communicating with other virtual devices.

As illustrated in FIG. 8, all the Windows applications run within the system virtual machine which operates in protected mode. The Windows Dynamic Link Libraries (DLLs) which support Windows applications also run within the system virtual machine.

Each DOS application in FIG. 8 runs within its own DOS virtual machine. Since the DOS virtual machines usually operate in the Virtual 8086 mode of the microprocessor, the DOS applications generally only address the 1 Megabyte of memory in the DOS virtual machine.

The Notification Mechanism of the Present Invention

FIG. 2 illustrates the notification mechanism of the present invention. Referring to FIG. 2, one embodiment of the notification mechanism of the present invention includes a docking station 201 with a network interface card (NIC) in the hardware environment coupled to provide a dock/undock event 220 to an event coordinator 202. Dock/Undock event 220 indicates whether the computer system has become docked to docking station 201 or whether the computer system has become undocked from docking station 201.

In the present invention, event coordinator 202 is in the network environment in DOS along with the protocol stack 204 and network driver 203. Event coordinator 202, protocol stack 204 and network driver 203 operate together to provide an interface between the computer system (e.g., the processing logic of the computer system) and the network (not shown). Different networks for use with the present invention may include, but are not limited to, Novell, Banyan, etc. In one embodiment, protocol stack 204 may refer to IPX/ODI, NDIS or TCP/IP, which are well-known in the art. In one embodiment, event coordinator 202 comprises an interrupt handler (e.g., IRQ handler). Event coordinator 202 may support other events along with dock/undock event 220 and, in such a case, may act as a central event dispatcher sending events to multiple virtual device drivers.

After sensing dock/undock event 220, event coordinator 202 notifies a notification virtual device driver (VxD) 205 operating in the Windows environment under the control of the Windows operating system 206. VxD 205 determines the type of event that occurred, i.e. whether the event is a dock or undock event.

After determining that the event comprises a dock or undock event, VxD 205 communicates the dock/undock status to the network application manager 207. Application manager 207 is aware of the applications that are currently running and polls applications, such as applications 208–210, to determine which applications are using the network resource (e.g., which applications are using the network).

In response to an undocked status indication from VxD 205, application manager 207 maintains the integrity of any of applications 208–210 that are running and using the network resource. That is, the present invention allows the user to continue using the computer system even though it is no longer connected to the network. In one embodiment, application manager 207 provides a dialog box to the user prompting the user that an application that is using a resource (e.g., file) on the network. Application manager 207 may question the user as to whether the user desires the file to be closed. If the user's response is affirmative, application manager 207 indicates to the user that the computer system must be redocked to docking station 201. Once redocked, the application manager 207 closes the file.

In one embodiment, application manager 207 may make the application inaccessible. That is, application manager 207 may prevent the user from accessing the application until the computer system has been coupled to docking station 201 again.

During the period of time in which the computer system is undocked from docking station 201, the network maintains the connection. When the user redocks, the computer system returns to the state it was in prior to being undocked. Thus, if the user desired to close a file that was left open when the computer system became undocked from docking station 201, the file is automatically closed by application manager 207 when the computer system is redocked, even though the computer system was undocked for a period of time.

The dock/undocked event may be sensed in multiple ways. In one embodiment, at least one of the pins (e.g., 2 or more) is shorter than the rest of the pins of the connector that electrically couples the computer system and docking station 201. When undocking the computer system from docking station 201, any shorter pins become disconnected before the remainder of the pins. Once these shorter pins become disconnected, yet prior to the other pins being disconnected, the computer system generates an interrupt (e.g., undock/dock event) to event coordinator 202. This interrupt is then trapped and broadcast throughout the computer system.

The Event Coordinator

The present invention provides an event coordinator 202 which senses the dock/undock event. Event coordinator 202 operates similarly to an event generator when the computer system is disconnected or connected. In one embodiment, the interface of docking station 201 is a standard bus interface (e.g., ISA, PCI) with an interrupt line, e.g. IRQ, indicating the status of the docking station. Whenever docking station 201 communicates with the computer system, the interrupt line (e.g., IRQ) is toggled. When the interrupt line is toggled, an interrupt routine (ISR) corresponding to the interrupt line detects the presence or absence of docking station 201. The information obtained when performing the detection is passed onto VxD 205 under Windows operating system 206. If need be, then VxD 205 could as well directly monitor of the dock status. 20 Note that apart from passing the information to VxD 205, network driver 203 may also utilize the information to save state information of one or more applications (e.g., clients) when an undocked message is received.

FIGS. 3A and 3B illustrate one embodiment of the processing of the event coordinator of the present invention. Specifically, FIG. 3A depicts the initialization process of the event coordinator, while FIG. 3B depicts the interrupt processing of the event coordinator of the present invention.

Referring to FIG. 3A, during boot-up of the computer system, event coordinator 202 undergoes initialization by first identifying the interrupt line (e.g., IRQ) for the event notification (processing block 301). Event coordinator 202 determines which IRQ is assigned to docking station 201 in order for docking station 201 to communicate and send messages to the computer system. In one embodiment, the interrupt line assigned to docking station 201 is fixed, while in an alternative embodiment, the system Basic Input Output Structure (BIOS) may have to identify the interrupt to event coordinator 202.

After identifying the interrupt assigned to docking station 201, event coordinator 202 installs an interrupt handler for handling the interrupt (processing block 302).

Referring to FIG. 3B, after an interrupt from docking station 201 has occurred, event coordinator 202 begins processing the interrupt by invoking the handler (processing block 310). Once the handler is invoked, event coordinator 202 identifies the event type as being a dock or undock event (processing block 311). In one embodiment, event handler 202 determines the type of interrupt by reading one or more register bit locations or flags set when the interrupt occurs.

After determining that the interrupt is a dock/undock event, event coordinator 202 determines whether the computer system is operating in Windows enhanced mode (processing block 312). In one embodiment, event coordinator 202 checks for the presence of Windows enhanced mode by using a standard multiplex interrupt (e.g., int 2F) call. The return value from this interrupt call indicates the status of Windows currently active in the system. If the computer system is not operating in Windows enhanced mode, event coordinator 202 does not respond to the occurrence of the dock/undock event and returns to a state in which its waiting for events to occur (processing block 313).

If event coordinator 202 determines that the computer system is operating in Windows enhanced mode, processing continues at processing block 314 where event coordinator 202 determines if VxD 205 of the present invention is present. In one embodiment, event coordinator 205 determines whether VxD 205 is present by testing whether the entry point of VxD 205 is equal to null. If the entry point of VxD 205 is null, then VxD 205 is not present and processing returns event coordinator 202 to the state in which event coordinator 202 waits for events to occur (processing block 313). However, if the entry point of VxD 205 is not null, then event coordinator 205 calls a VxD Application Programming Interface (API) function and sends VxD 205 the event that occurred (processing block 315). This specific function called by event coordinator 205 is a function recognized by VxD 205. After calling the VxD API function with the event, processing returns to the state in which event coordinator 202 waits for events to occur (processing block 313).

The Notification VxD of the Present Invention

The notification VxD 205 of the present invention acts as an interface between DOS and Windows operating system 206. Under the Windows 3.1 architecture, a message cannot be posted directly to an applications queue by a VxD. Whenever notification is received by the VxD, it makes sure that the system VM is running by calling an associate DLL, which would then post the appropriate message to application manager 207.

FIGS. 4A and 4B illustrate the processing logic of one embodiment of the notification VxD 205. FIG. 4A depicts two separate functions that are called during the initialization of VxD 205, while FIG. 4B depicts the processing logic of the function that is called by event coordinator 202 during interrupt processing (FIG. 3B).

Referring to FIG. 4A, during initialization of the notification VxD window, the processing logic of the present invention performs a return version function. In one embodiment, the return version function (processing block 401) returns the version number of VxD 205, as opposed to that of Windows. This is one of the interface functions available to allow an application that communicates to VxD 205 to first obtain its version number and decide on what calls VxD 205 supports. It also helps in maintenance of future releases of a VxD.

Also during initialization, the DLL in application manager 207 calls API function 1. In response to the DLL call, VxD 205 stores the DLL callback address using the processing logic of the present invention (processing block 402). By storing the call back address, VxD 205 knows of the existence of the DLL and is able to send messages to application manager 207, via the DLL, when notified of dock/undock events from event coordinator 202. After storing the DLL callback address, VxD 205 stores the window handle (processing block 403). VxD 205 cannot call the application manager 207 directly with the window handle. The reason for passing the window handle to VxD 205 (via DLL) is to ensure that the application that loaded the DLL passed a valid handle to the DLL. VxD 205 internally will check for a non-zero windows handle before passing on the type of event received from event coordinator 202.

Referring to FIG. 4B, when event coordinator 202 calls VxD API Function 2 with the dock/undock event, the processing logic of VxD 205 initially stores the incoming dock/flag state passed from event coordinator 202 during interrupt processing (processing block 410). Then VxD 205 determines whether messages may be sent to the DLL and application manager 207 (processing block 411). In one embodiment, VxD 205 determines whether messages may be sent to the DLL and application manager 207 by checking whether the callback address is null. If the callback address equals null, such that no DLL callback address is present, the processing logic of VxD 205 returns (processing block 412). If the callback address is not null, processing continues at processing block 413 where a test determines whether the computer system is in system VM. If the computer system is in system (SYS) VM, then a call is made to the DLL with the dock/undock flag (processing block 414). On the other hand, if the computer system is not in SYS VM, then the processing logic of VxD 205 schedules a SYS VM call to transition the system into SYS VM (processing block 415) and then processing continues at processing block 414 where the call using the callback address is made to the DLL with the dock/undock flag. In other words, once the system is in SYS VM, then VxD 205 posts a message to the DLL with the dock/undock flag.

Notification DLL of the Present Invention

In one embodiment, the DLL is separate software executed in the computer system (e.g., by the processor) apart from application manager 207. This DLL is automatically loaded whenever application manager 207 is initialized. In other words, initially there is a check to determine if the enhanced mode of Windows is active.

The networked application manager 207 examines all of the tasks currently active and determines which of them have any relation to the network services. Upon receiving an undock notification, application manager 207 may inactivate all such applications. By inactivating all such applications, Windows messages will not be sent to that application until a dock notification reactivates all of them. At that time, the user is free to use all of the application that are local to the computer system.

FIGS. 5A, 5B and 5C illustrate the notification DLL processing logic flow. Referring to FIG. 5A, the notification DLL flow begins by calling the main library subroutine during initialization of Windows. This call represents an entry point to the DLL that is well-known to those in the art. The processing logic of the library call begins by performing a check to determine whether the computer system is in enhanced mode (processing block 501). In other words, initially there is a check to determine whether Windows is running. After determining that Windows is running, the processing logic obtains the entry point of VxD 205 (processing block 502). Based on the entry point that is obtained, the processing logic updates an error code (processing block 503). If the entry point of VxD 205 is not null, then the error code indicates that VxD 205 exists. On the other hand, if the entry point of VxD 205 is null, the error code is updated to indicate that VxD 205 does not exist.

FIG. 5B illustrates the interface functions performed by the notification DLL processing logic. The DLL exports four interface functions that application manager 207 or the DLL loader will call. "LibMain" and "WEP" are used by Windows while loading/unloading the DLL from memory. Application manager 207 uses the Register Handle function to register its window handle with the DLL. When this API is called, internally the DLL will attempt to register a callback function and the passed-in handle with the VxD. Also, application manager 207 uses the "Get DLL error code" function to obtain the status of the DLL (processing block 512). If this function call returns a valid error code, then application manager 207 will not get loaded. The DLL will also be automatically unloaded. Finally, the processing logic executes the Windows Exit Procedure (WEP) of Windows 3.1, which is well-known to those skilled in the art (processing block 513).

FIG. 5C illustrates the callback function of the notification DLL processing logic. When performing the callback function, the processing logic tests whether the flag received from VxD 205 is a dock or undock event (processing block 521). If the dock event does exist, a dock message is posted to the handle (processing block 522). On the other hand, if the dock event does not exist, then an undocked message is posted to the handle (processing block 523). The DLL posts the messages using the handle registered with the DLL during initialization. Note that if the virtual device driver is capable of sending messages directly to an application, then a DLL is not required.

Networked Applications Manager Processing Logic

FIGS. 6A and 6B illustrate the processing logic for networked application manager 207. FIG. 6A illustrates the processing logic during initialization, while FIG. 6B depicts the message processing.

Referring to FIG. 6A, during initialization, the networked application manager initially checks to determine whether there is a unique instance of Windows running (processing block 601). Then, the processing logic obtains the DLL and VxD presence status (processing block 602). The status of the DLL and VxD 205 are obtained when the DLL gets loaded and application manager 207 obtains the error code for VxD 205 (that was obtained during processing block 512). Thus, by communicating with the DLL, the networked application manager 207 obtains both the DLL and VxD status.

After obtaining the DLL and VxD status, the Window handle is registered with VxD 205 through the DLL (processing block 603). In one embodiment, the Window handle is registered using the callback address. Note that this registration corresponds to the callback and handle being registered with VxD 205 in the DLL flow at processing block 511.

The application manager 207 then evaluates the network drives to obtain a list of drive that are currently available (processing block 604). The drives are available after completion of the log-on sequence. In one embodiment, the network drives may be identified as those drives that are not fixed. Using a call to the BIOS and load layers, all of the drives that belong to the network may be obtained. Thereafter, application manager 207 processes messages that are associated with Windows (processing block 605), including the dock/undock messages.

Referring to FIG. 6B, the message processing of application manager 207 for an undocked event begins by receiving the notification of the undock from the DLL (processing block 611). Upon receiving the undock notification, application manager 207 disables the network related applications (processing block 612) and/or informs the user about the disconnect (processing block 613).

In one embodiment, the present invention only disables the network related applications or informs the user about the disconnect. The notification may be in the form of a dialog box, or window, that appears on the display screen notifying the user that there has been a disconnect from docking station 201. The dialog box may list network resources that are still in use or still required by currently running applications.

When disabling the applications, application manager 207 may hide the application or represent the application on the desktop as an icon while disabling the application to prevent access. In another embodiment, application manager 207 creates an icon which is non-responsive to user input, such that the application cannot be accessed until the user redocks or reboots the computer system. Creation of an icon on a computer display is well-known to those skilled in the art.

Note that solely hiding the application from the user may cause concern to the user because the user may not be knowledgeable regarding the computer system.

After processing the message, application manager 207 destroys the message received (processing block 621), registers a null handle with VxD 205 to eliminate VxD 205 for the next event (processing block 622). Because VxD 205 is registered with a null handle, application manager 207 will not send messages to it, effectively disabling an application. That is, messages will not be posted to VxD 205 because event coordinator 202 cannot locate VxD 205. This prevents the application from crashing. Thereafter, application manager 207 posts a quit message (processing block 623).

The message processing for a dock notification begins with receipt of a dock notification from the DLL (processing block 631). In response to the dock notification, the processing logic of application manager 207 evaluates the network drives to reestablish those drives (processing block 632), such that the network drives may be identified once again. This allows files on the network to be opened. Next, disabled network applications are reactivated (processing block 633). Note that at this time, the virtual connection to the network remains alive during the disconnect period, such that connection of docking station 201 to the computer system reestablishes the communication channel between the network and the computer system as if the computer system was never undocked.

Note that the network is responsible for maintaining the (virtual) connection. As far as the network is concerned, the connection still exists. Therefore, when the user redocks the computer system to the docking station, a log-on sequence is not required to obtain access to the network resources. The network server is responsible for maintaining the virtual connection. Such a network server is provided by Novell Inc. of Provo, Utah. Thus, the present invention uses the virtual connection maintained by the network server to maintain application integrity in a hot networking environment.

In summary, the present invention provides an architecture that maintains the integrity of a networked application after a network has been disconnected (hot) from a computer system. The present invention may disable an application when the network disconnect occurs. The disabled application is restored back to its original active state as soon as the network connection has been re-established. In this manner, the present invention prevents a network application from crashing the system when a network resource has been removed.

Also the system may continue to be used without rebooting even though applications might be loaded and running on the computer system which require access to no longer available resources. In other words, the present invention avoids having to manually close all applications and logout from the network before undocking. On a reconnect, the present invention allows the user to avoid having log-on and reopen the applications.

Note that the present invention is applicable to monitoring the presence/absence of resources such as file systems, docking, peripheral devices, etc.

Exemplary Computer System of the Present Invention

FIG. 7 is a block diagram of one embodiment of the computer system that may incorporate the teachings of the present invention. Referring to FIG. 7, computer system 700 comprises a bus or other communication means 701 for communicating information, and a processor 702 coupled with bus 701 for processing information. Processor 702 may comprise, but is not limited to microprocessors such as the Intel™ Architecture Microprocessor, such as manufactured by Intel Corporation of Santa Clara, Calif., the corporate assignee of the present invention, PowerPC™, Alpha™, etc.

System 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computer system 700 also comprises a read only memory (ROM) and/or other static storage device 706 coupled to bus 701 for storing static information and instructions for processor 702, and a data storage device 707 such as a magnetic disk or optical disk and its corresponding disk drive. Data storage device 707 is coupled to bus 701 for storing information and instructions.

Computer system 700 may further be coupled to a display device 721, such as a cathode ray tube (CRT) or liquid crystal display (LCD) coupled to bus 701 for displaying information to a computer user. An alphanumeric input device 722, including alphanumeric and other keys, may also be coupled to bus 701 for communicating information and command selections to processor 702. An additional user input device is cursor control 723, such as a mouse, a trackball, stylus, or cursor direction keys, coupled to bus 701 for communicating direction information and command selections to processor 702, and for controlling cursor movement on display 721. Another device which may be coupled to bus 701 is hard copy device 724 which may be used for printing instructions, data, or other information on a medium such as paper, film, or similar types of media. Furthermore, a sound recording and playback device, such as a speaker and microphone may optionally be coupled to bus 701 for interfacing with computer system 700.

As described above and shown in FIG. 2, the computer system of the present invention may comprise a docking station capable of receiving various cards, such as a network interface card (NIC), that allow the computer system access to resources, such as a network (in case of an NIC).

In functional terms, processor 702 is the central processing unit for computer system 700. RAM 704 and ROM 706 are used to store the operating system of computer system 700 as well as other programs, such as file directory routines and application programs, and I/O data. In one embodiment, ROM 706 is used to store the operating system of computer system 700, while RAM 704 is utilized as the internal memory of computer system 700 for accessing data and application programs.

Note that any or all of the components of system 700 and associated hardware may be used, however, it can be appreciated that any type of configuration of the system may be used for various purposes as the user requires.

Whereas, many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of various embodiment are not intended to limit the scope of the claims which in themselves recite only those features regarded as essential to the invention.

Thus, a method and apparatus for maintaining application integrity has been described.

We claim:

1. A system comprising:

a bus;

at least one memory coupled to the bus;

a processor coupled to the bus to execute instructions and run an operating system and at least one application;

the bus, said at least one memory and the processor forming a computer subsystem;

a network;

a network connection coupled to the computer subsystem and the network to interface the computer subsystem to the network;

a notification mechanism to dynamically detect when the computer subsystem is undocked from the network and allow continued use of the computer subsystem without rebooting after undocking.

2. The system defined in claim 1 wherein the network connection comprises a docking station.

3. The system defined in claim 1 further comprising an application manager, and wherein the notification mechanism comprises an event coordinator to detect an event indicative of the dock/undock state of the network and to post the event and a virtual device driver (VxD) coupled to the event coordinator to provide a notification of the event to the application manager, which prompts the user with the state of the network.

4. The system defined in claim 3 wherein the application manager comprises a dynamic load library (DLL) to translate messages from the VxD to said at least one application.

5. The system defined in claim 1 wherein the notification mechanism detects when the network is redocked to the network connection and allows the computer system to use network resources without logging-in.

6. A system comprising:
   a bus;
   at least one memory coupled to the bus, wherein said at least one memory stores an operating system, an application program, an application manager, and a notification mechanism;
   a processor coupled to the bus to run the operating system, the application program, the application manager, and a virtual device driver, wherein the bus, said at least one memory and the processor form a computer subsystem;
   a network connection interfacing the computer subsystem to the network;
   wherein the virtual device driver is responsive to an event from an event coordinator that dynamically indicates when the computer subsystem is undocked, therein causing the virtual device driver to provide a notification of the event to the application manager, which allows continued use of the computer subsystem without rebooting after undocking.

7. The system defined in claim 6 wherein the application manager prompts the user regarding the state of the network.

8. The system defined in claim 6 wherein the application manager comprises a dynamic load library (DLL) to translate messages from the VxD.

9. The system defined in claim 6 wherein the virtual device driver receives an indication from the event coordinator when the network is redocked to the network connection to allow the computer subsystem to use network resources without logging-in.

10. The system defined in claim 1 further comprising an application manager to determine whether the application uses a network resource provided by the network.

11. The system defined in claim 10, wherein the application manager further notifies a user that the application is not available when the computer subsystem is undocked from the network and the application uses the network resource.

12. The system defined in claim 11, further comprising a user interface to notify the user that the application is not available.

13. The system defined in claim 11, wherein the application is grayed out when the application is not available.

14. The system defined in claim 1, wherein the notification mechanism further dynamically detects when the computer subsystem is redocked to the network.

15. The system defined in claim 14, wherein the notification mechanism further determines whether there are any applications that use a network resource provided by the network.

16. The system defined in claim 15, wherein the notification mechanism makes the application available again, if the application uses the network resource, and was not available when the computer subsystem was undocked from the network.

17. A computer system comprising:
    a bus;
    a processor coupled to the bus to execute instructions and run an operating system and at least one application;
    a network connection coupled to the computer system to interface the computer system to a network;
    a notification mechanism to dynamically detect when the computer system is undocked from the network and allow continued use of the computer subsystem without rebooting after undocking; and
    an application manager to determine whether the at least one application uses network resources provided by the network and to disable those applications that use the network resources, when the computer system is undocked from the network.

18. The computer system defined in claim 17, further comprising a user interface to notify the user that the application is not available if the application uses the network resources and the computer system is undocked from the network.

19. The computer system defined in claim 17, wherein the notification mechanism further dynamically detects when the computer subsystem is redocked to the network.

20. The computer system defined in claim 17, wherein the notification mechanism makes the application available again, if the application uses the network resource, and was not available when the computer subsystem was undocked from the network.

* * * * *